UNITED STATES PATENT OFFICE.

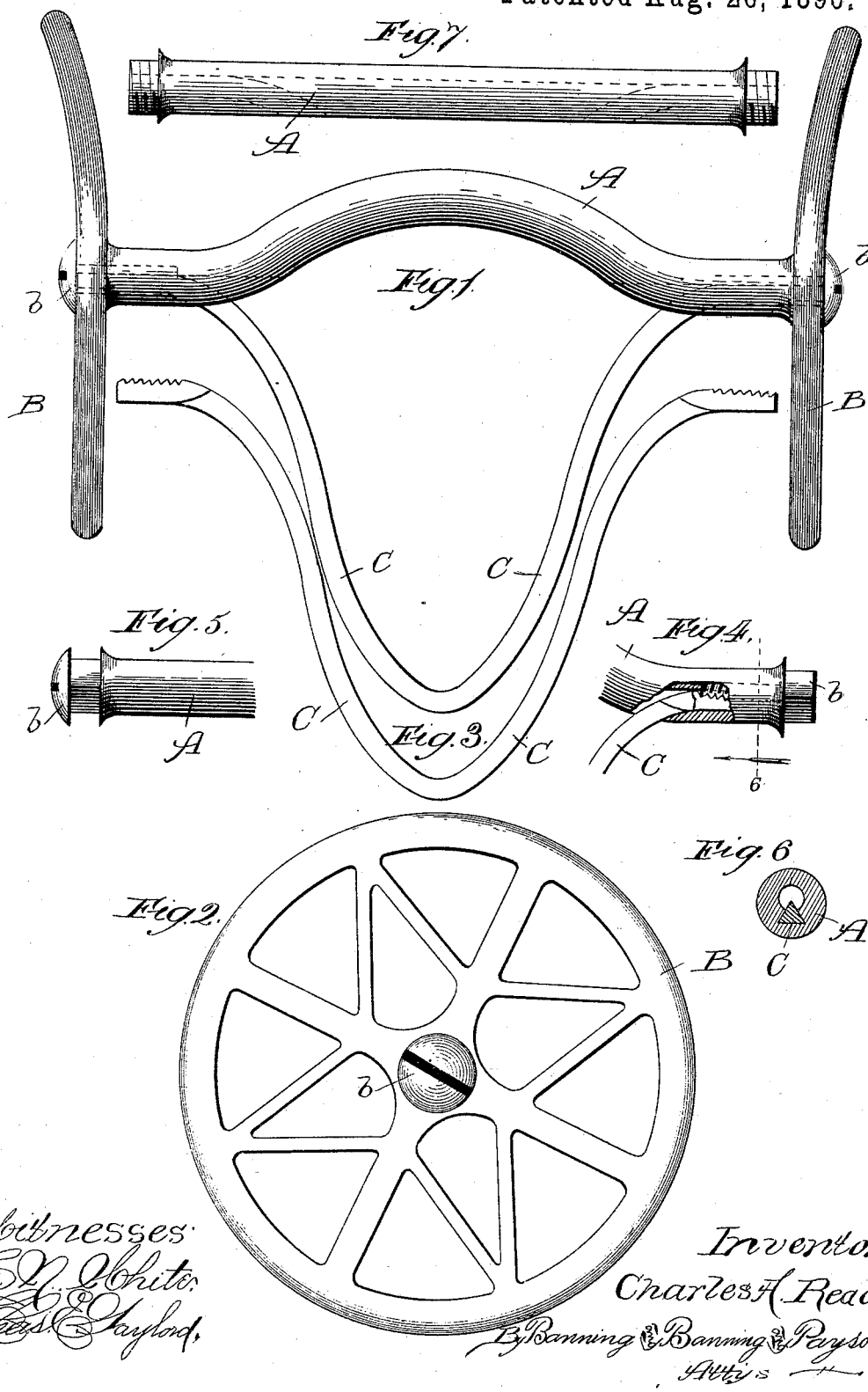

CHARLES A. READE, OF CHICAGO, ILLINOIS.

BRIDLE-BIT.

SPECIFICATION forming part of Letters Patent No. 435,189, dated August 26, 1890.

Application filed July 29, 1889. Serial No. 319,128. (No model.)

*To all whom it may concern:*

Be it known that I, CHARLES A. READE, a citizen of the United States, residing at Chicago, Cook county, Illinois, have invented certain new and useful Improvements in Bits, of which the following is a specification.

The object of my invention is to provide a simple and economical bit which is capable of being readily taken apart and put together, and which shall be provided preferably with an easily-adjustable tongue-bar and rings large enough to keep the bit-bar out of the horse's teeth.

In the drawings, Figure 1 represents a plan view of my improved bit; Fig. 2, a side elevation of one of the rings; Fig. 3, a plan view of the tongue-bar removed from the bit; Fig. 4, a view of one end of the bit-bar partly broken away to show the tongue-bar; Fig. 5, a similar view, showing the screw; Fig. 6, a sectional view of Fig. 5, looking in the direction of the arrows, showing the groove for the expansible tongue-bar, and Fig. 7 a a plan view of a modified form of bit-bar.

A is the bit-bar; B, the rings; $b\ b$, screws for holding the rings in place, and C the tongue-bar.

In making my improved bit, I first make the metallic bar A of suitable length and diameter and preferably curved, as shown in Fig. 1, and to the ends of this I attach the rings B B. These rings are preferably made of metal and of a circular form, as shown more particularly in Fig. 2. They may be made solid or with open work, as desired, and are preferably curved outward to afford room for the horse's head. These rings are provided at the center with a square socket, which fits over the ends of the bit-bar, which is made square to receive them, as shown in Fig. 4, and are then held in place by means of the screws $b\ b$. It will be seen from this construction that the rings may be easily taken off in order to change the bit-bar or to cover it with rubber, or for any other purpose.

I next make, preferably of metallic rod or wire, the tongue-bar C. This is bent somewhat in the shape of a letter U, as shown in the drawings, and has each of its ends formed with a triangular cross-section provided with notches for the purpose hereinafter set forth. The front sides of the ends of the bit-bar are provided with grooves or slots, into which the ends of the tongue-bar fit. In order to insert this bar the screws $b\ b$ are first removed and the tongue-bar compressed, bringing the two ends close together. These ends are then inserted into the inner ends of the slots in the bit-bar, and the resiliency of the tongue-bar forces the ends into the slots. The screws $b\ b$ are next screwed in, and the teeth, engaging with the notches formed on the ends of the tongue-bar, hold the same firmly in place. If it be desired to remove the tongue-bar, this process is reversed, the screws $b\ b$ are taken out, and the tongue-bar then removed by pressing its ends near enough together to allow them to clear the inner ends of the slots in the bit-bar.

In Fig. 7 I have shown a modified form of bit-bar, consisting of a tubular piece of metal of a proper diameter and length and provided at the ends with shoulders and screw-threads, as shown. In this construction I dispense with the screws $b\ b$ and provide the rings with screw-threaded sockets on their inner sides, by means of which they are fastened to the ends of the bar A. If made in this way, the tongue-bar might be held in place by its expansive force solely, or its edges might be notched, as formerly described, so as to engage with and be retained by the screw-threaded socket of the rings.

The advantages of my improved bit are its simplicity and the ease with which it can be taken apart and put together again. Although I have shown these rings as circular, and have claimed them as such, I do not wish to be limited to that form, as they might be square, hexagonal, octagonal, or any other form that would answer the above purpose. By means of this construction I obtain all the advantages of the former style of bits without their disadvantages. For instance, the tongue-bar could be extended to form a double curb-bit, by means of which the horse can be readily controlled without injury to his mouth, such as results from the use of the old W and double-wire bar-bit, &c.

I claim—

The combination of a bit-bar having grooves in its forward sides, rings detachably connected with the ends of such bar, and an expansible tongue-bar adapted to be compressed to allow the ends thereof to enter such slots and to be forced therein by the expansion of the tongue-bar, and means for engaging with such tongue-bar and retaining the same in place, substantially as described.

CHARLES A. READE.

Witnesses:
GEORGE S. PAYSON,
HATTIE A. FARNHAM.